United States Patent [19]

Pradhan et al.

[11] 4,053,357

[45] Oct. 11, 1977

[54] AIR BOX SHOCK ABSORBER FOR A NUCLEAR REACTOR

[75] Inventors: Ashok V. Pradhan, Beechwood, Ohio; John A. George, Greensburg, Pa.

[73] Assignee: Westinghouse Electric Corporation, Pittsburgh, Pa.

[21] Appl. No.: 637,553

[22] Filed: Dec. 3, 1975

[51] Int. Cl.² .......................................... G21C 19/32
[52] U.S. Cl. .................................. 176/37; 176/38; 176/87; 188/1 C; 16/84
[58] Field of Search ............... 176/37, 38, 87; 16/82, 16/84; 188/1 C

[56] References Cited

U.S. PATENT DOCUMENTS

| | | | |
|---|---|---|---|
| 969,641 | 9/1910 | Laughlin et al. | 16/84 |
| 1,459,238 | 6/1923 | Naslin | 16/83 |
| 2,201,594 | 5/1940 | Sitts | 16/82 X |
| 3,115,450 | 12/1963 | Schanz | 176/37 X |
| 3,410,511 | 11/1968 | Coppa | 188/1 C X |
| 3,580,806 | 5/1971 | Weems et al. | 176/37 |
| 3,726,759 | 4/1973 | Taft et al. | 176/37 |
| 3,796,286 | 12/1971 | Kraupa | 188/1 C X |
| 3,844,885 | 10/1974 | Weems et al. | 176/37 |
| 3,937,651 | 2/1976 | Schabert et al. | 176/38 |

*Primary Examiner*—Peter A. Nelson
*Attorney, Agent, or Firm*—Edward L. Levine; Z. L. Dermer

[57] ABSTRACT

An air box type shock absorber primarily for use in an ice condenser compartment of a nuclear reactor. The shock absorber includes a back plate member and sheet metal top, bottom, and front members. The front member is prefolded, and controlled clearances are provided among the members for predetermined escape of air under impact and compression. Prefolded internal sheet metal stiffeners also absorb a portion of the kinetic energy imparted to the shock absorber, and limit rebound. An external restraining rod guided by restraining straps insures that the sheet metal front member compresses inward upon impact.

6 Claims, 11 Drawing Figures

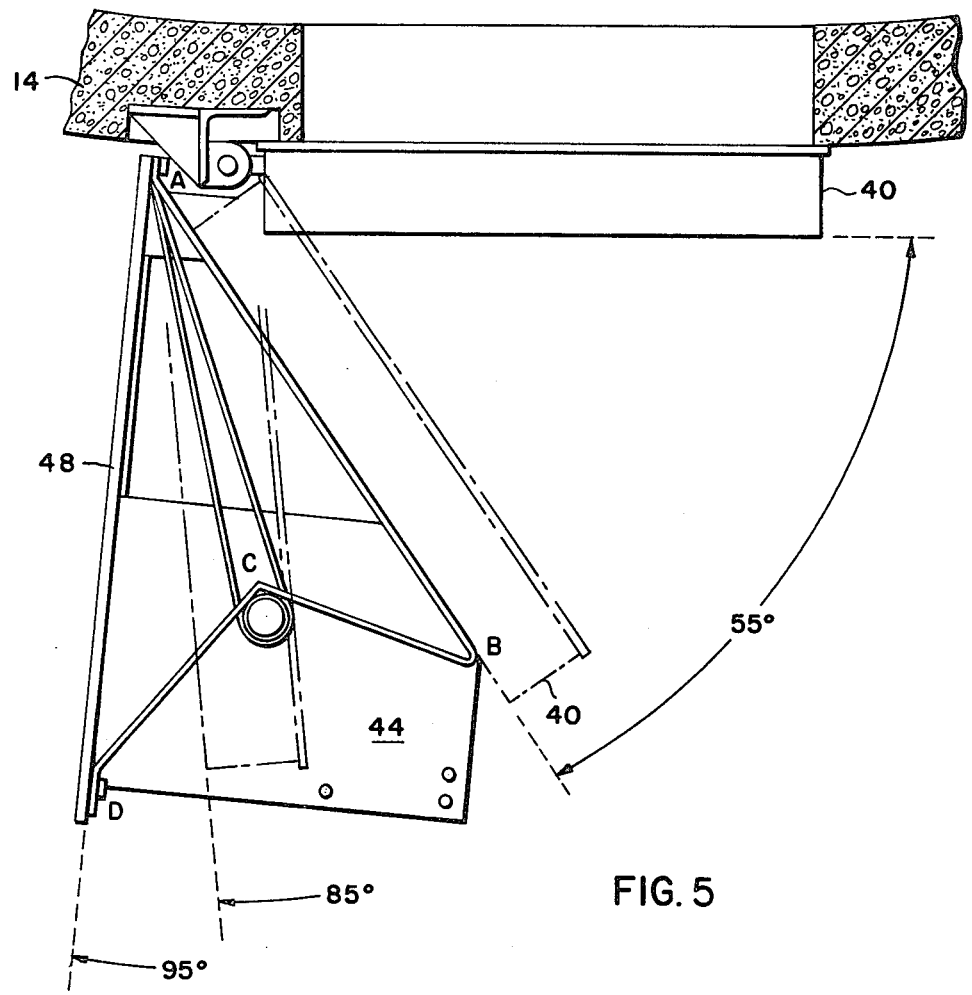
FIG. 5
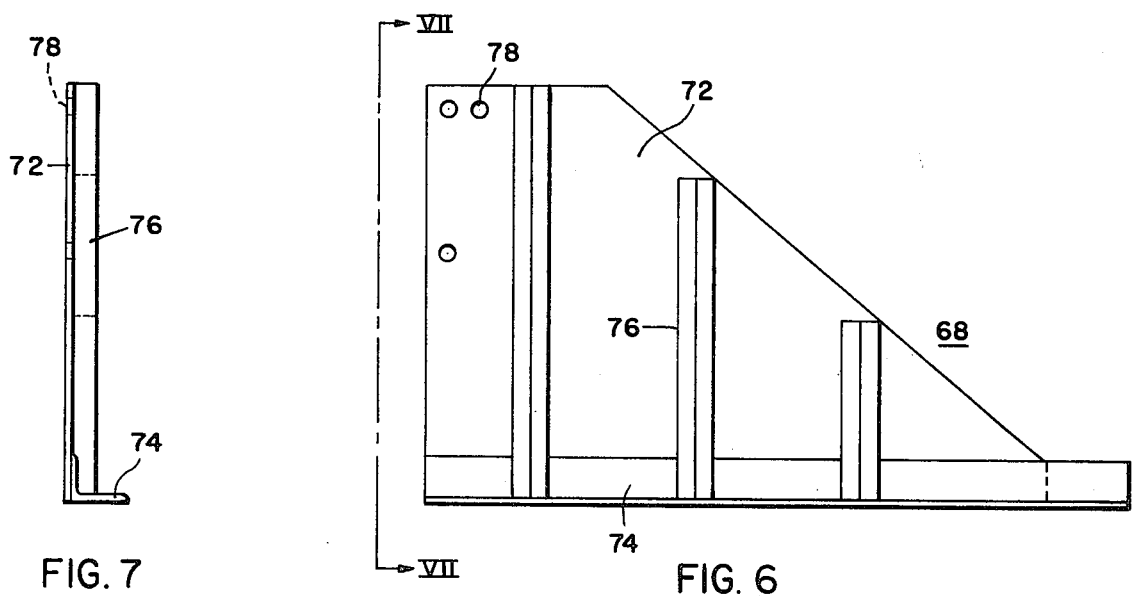
FIG. 7
FIG. 6

AIR BOX SHOCK ABSORBER FOR A NUCLEAR REACTOR

BACKGROUND OF THE INVENTION

1. Field of the Invention

The invention described herein relates to shock absorbers for hinged doors; and more particularly to a shock absorber system for ice condenser doors in a nuclear reactor power plant.

2. Description of the Prior Art

The major components of a nuclear reactor power plant including the reactor, pumps, steam generators and connecting piping are located in a concrete containment structure. Coolant circulated through the reactor by the pumps absorbs heat from the fission process and as this heated coolant is passed through the steam generators, the heat is transferred to a secondary circuit which then provides steam for driving a turbo-generator which generates electric power. During the course of circulating such coolant into heat exchange relationship with the reactor fuel elements, gases and particles in the coolant may become radioactive and cannot be permitted to escape to the atmosphere. It therefore is apparent that in the unlikely event of rupture of the primary coolant piping, the released coolant flashes into steam and the released radioactive particles must be contained in the reactor containment. To accommodate the consequent rise in pressure inside the reactor containment and to prevent such escape of radioactive particles to the atmosphere, one well known method includes condensing the steam by passing it over ice located in a compartment positioned around the inside walls of the reactor containment.

U.S. patent application Ser. No. 435,903, filed Dec. 23, 1973 by S. J. Weems et al. entitled "Nuclear Reactor Condenser Door Arrangement", assigned to the same assignee as the present invention, discloses different designs and features of an ice condenser compartment used for this purpose. As shown and described therein, doors are located in the bottom and at the top of the ice condenser compartment. Should a steam break occur, such as complete rupture of the largest coolant pipe, steam released by the coolant generates a pressure which opens the bottom doors thus permitting steam including radioactive particles to enter the compartment and condense on the ice located therein. After the initial pressure surge, the doors must be capable of returning to a normally closed position without being warped or otherwise bent in order to continue performing their flow metering function of regulating and proportioning the long term steam boil-off due to decay heat.

Present designs of doors which conventionally measure 84–92 inches high, 42 inches wide, and 8 inches thick will generate about 30,000 to 50,000 foot pounds of energy when the surface of a door facing the reactor compartment is exposed to a pressure of about 12 psi. This pressure is sufficient to open the doors at a high velocity and an important reason for absorbing the door energy with a shock absorber that limits the forces is that otherwise the forces imposed by the swinging door on the ice condenser compartment door frames and the adjacent wall may well damage the structural components sufficiently as to require extensive repairs to the structure.

A shock absorber was initially designed which adequately performed the intended absorbing function, but which was complicated and expensive to manufacture. It is described in detail in application Ser. No. 459,450, by Joseph F. Meier et al., filed Apr. 9, 1974, and assigned to the Westinghouse Electric Corporation. The Meier et al. shock absorber basically comprised a phenolic foam with rigid-brittle type failure in compression. However, as such foam disintegrates into very small particles during compression, it had a potential for draining to the containment sump and blocking flow areas. The foam was therefore encased in a specially manufactured plastic bag, and the bag enclosed in a knitted wire mesh bag. Further, to provide necessary redundancy and to preserve the geometry of the foam during compression, stainless steel sheet metal was used to cover the absorber impact face and the top and bottom surfaces of the absorber. This design presented a complicated series of components which, although meeting the functional criteria, was complex and costly. Also, the size and shape of the prior absorber made it somewhat difficult to install and would be difficult to remove and dispose of subsequent to an accident.

A shock absorber which eliminates these concerns while retaining the positive functional aspects is disclosed herein. It constitutes an improvement in the design and operation of the shock absorber disclosed in the above discussed Meier et al. application.

SUMMARY OF THE INVENTION

This invention provides an improved shock absorber which retains the positive aspects of the prior art, and which is significantly less complex to manufacture, less expensive, more sensitive to a variety of loads, and possessing increased safety characteristics. Briefly stated, an air box type shock absorber is provided which may be mounted inside an ice condenser compartment associated with a nuclear reactor. In the unlikely event of a rupture of the reactor primary system, doors in the condenser compartment walls are forced to an open position and against the shock absorber by steam pressure. The hinged doors move with a very high kinetic energy. The shock absorber impact surface is sized slightly larger than the door, and is designed with characteristics to assure absorption of energy with minimum rebound and without damage to the door, door frame, and supporting structure.

In the main embodiment the shock absorber includes a rigid back member, a prefolded sheet metal front member, and sheet metal top and bottom members. The impact face is on the front member, which collapses in a folding fashion and compresses the air within the shock absorber upon impact to absorb kinetic energy. Air is forced outward through controlled clearances. A restraining rod is included to ensure that the front member collapses in a predetermined manner. The absorber is also designed to control the rebound and loading on the components during operation. The shock absorber is relatively easy to manufacture and install, and meets functional requirements as shown by detailed testing.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings wherein:

FIG. 5 is a schematic plan view of the inlet door and shock absorber, showing angular relationships;

FIG. 6 is a view of the outer surface of the bottom member of the shock absorber;

FIG. 7 is an end view taken at VII—VII of FIG. 6;

DESCRIPTION OF THE PREFERRED EMBODIMENTS

Figure 1:
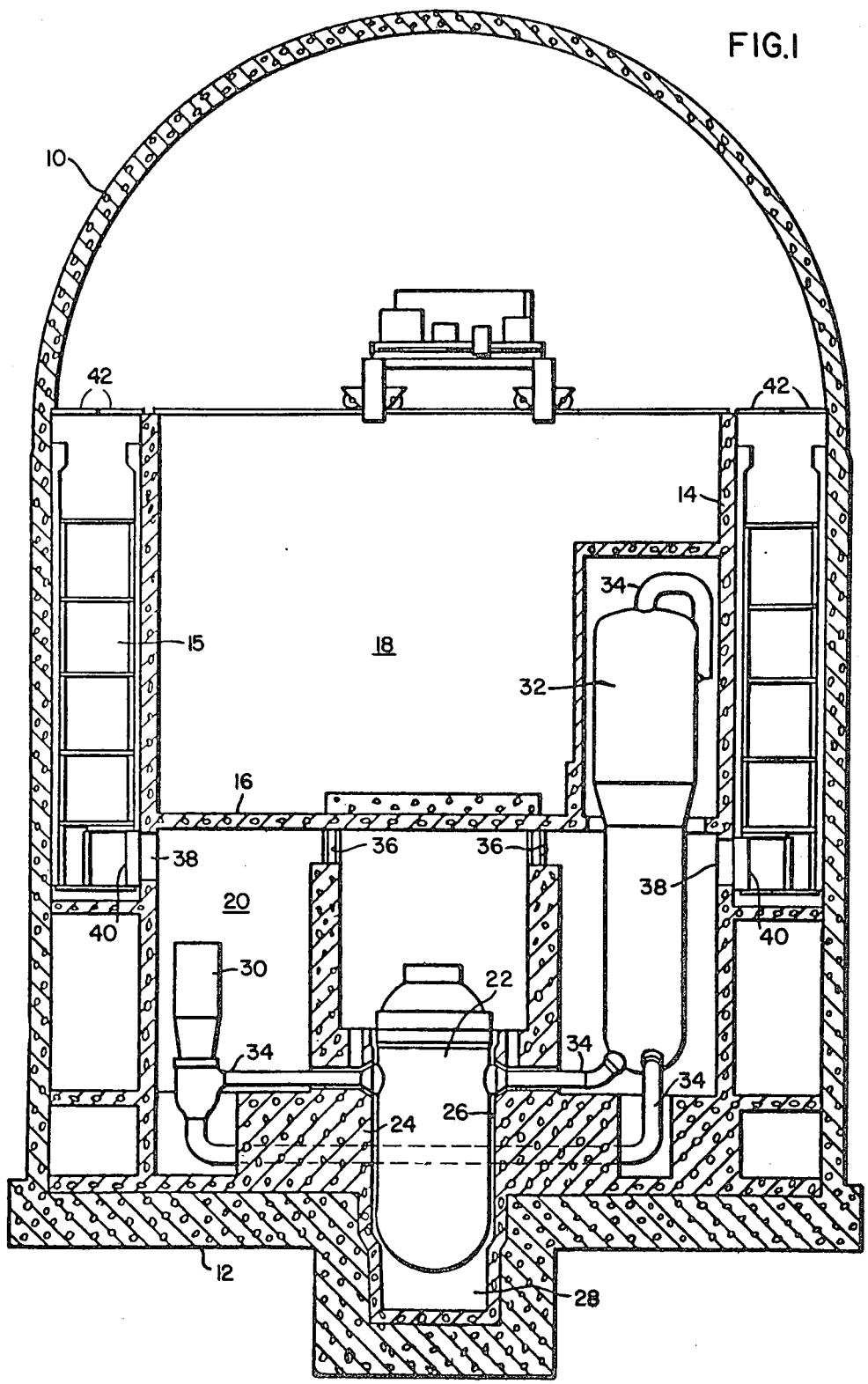
FIG. 1 illustrates the general arrangement of components in a nuclear reactor system and an ice condenser compartment mounted on the side walls of a concrete containment wall.

Referring now to the drawings, there is shown in FIG. 1 a nuclear reactor and its associated components located inside a wall which encloses an ice condenser compartment. The primary function of the ice condenser is to absorb energy released by the reactor coolant in the unlikely event of a major rupture occurring in the reactor primary system. The typical design shown includes a dome-like concrete containment wall 10 supported on base 12. A cylindrical wall 14 extends around the inside of the containment area for about 300° and the area between the cylindrical wall 14 and the concrete containment wall 10 defines an ice condenser compartment 15. A floor 16 divides the containment into upper and lower reactor compartments 18 and 20. The nuclear reactor pressure vessel 22 generally shown is spaced from a concrete enclosure 24 by a gap 26, and a sump 28 below the reactor serves to contain water which may escape from a rupture in the primary system, and to contain melted ice from the condenser compartment 15. Conventionally, reactor coolant pumps 30 circulate coolant through the reactor to a steam generator 32 through piping 34 in a primary closed loop. Heat imparted to the coolant by the fission process taking place in the reactor is transferred in the steam generator to a secondary circuit which provides steam for driving turbo-generator apparatus, not shown.

As illustrated in FIG. 1, the enclosed area above the reactor includes vent openings 36 which lead to inlet ports 38 closed by normally closed vertically hinged doors 40 located in the bottom of the ice condenser compartment 15. Horizontally hinged doors 42 at the top of the condenser compartment also are maintained in a normally closed position. In its preferred form, ice in the condenser compartment 15 is contained in cylindrical columns not shown, the arrangement being disclosed in U.S. Pat. No. 3,726,759 issued Apr. 10, 1973 to W. G. Taft et al and assigned to the Westinghouse Electric Corporation.

The function of the ice condenser is to absorb both radioactive gases and energy released by the reactor coolant should it escape from the closed primary loop comprising the reactor, pumps, steam generators, and piping. The coolant is circulated at a relatively high temperature and pressure through the reactor system and in the event a major rupture occurs, the released coolant flashes into steam. The sudden increase in pressure in reactor compartment 18 is sufficient to open each of about 48 doors 38 located around the inside of the condenser compartment. Should the steam break be massive, the doors are violently forced open and the resulting steam flows into and upwardly through the ice condenser 15 where it condenses on the ice thus decreasing the pressure in the compartment. The melted ice then flows downwardly into the reactor lower compartment 20 and sump 28. Doors 42 at the top of the ice condenser compartment also are moved to an open position thus permitting recirculation of air and water vapor through the reactor compartment and the condenser compartment.

Figure 2:
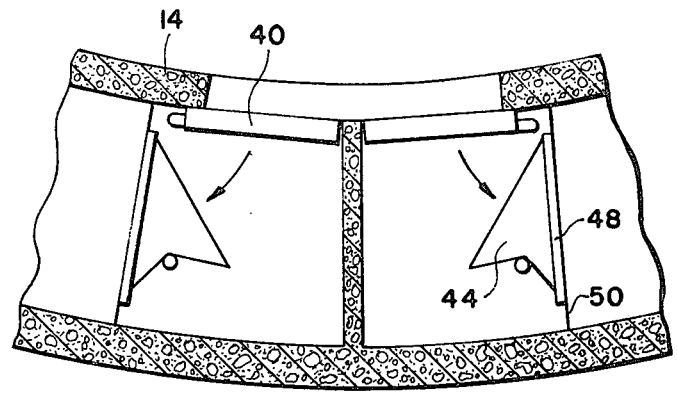
FIG. 2 is a simplified plan view showing the relation of the shock absorbers to the inlet doors and supporting structure.
Figure 4:
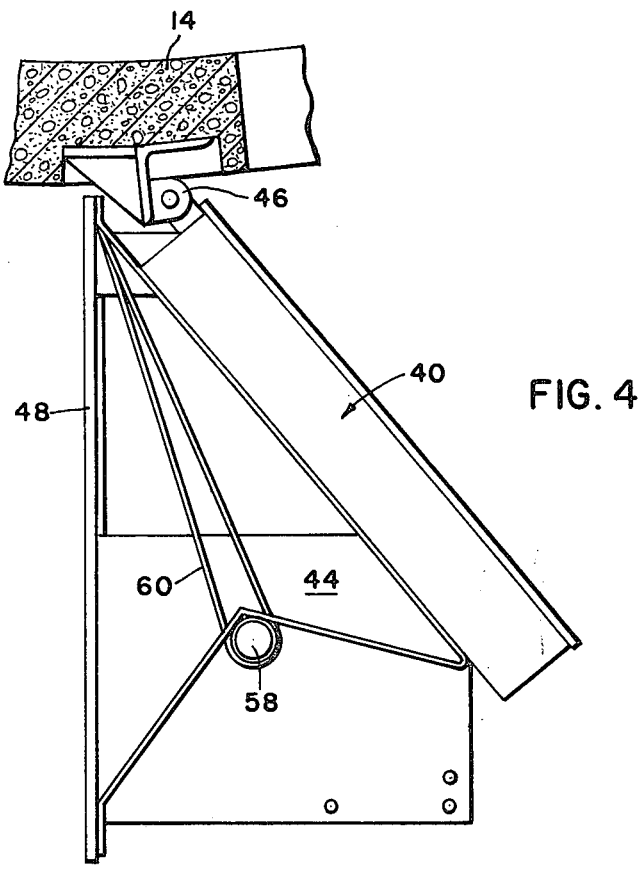
FIG. 4 is a plan view of the shock absorber and inlet door additionally showing the door hinge.

The above discussion of the nuclear reactor ice condenser system for absorbing energy released by coolant has been made to permit a more complete understanding of the present invention. This invention is directed toward the design of a door shock absorber 44 (FIG. 2) mounted on the condenser side of each inlet door 40. Each door roughly measures 8 feet high, 3½ feet wide, 8 inches thick and weighs 360 pounds. It is estimated that a major rupture in the reactor piping will generate a sudden pressure of about 12 psi on the door surface. Such pressure is sufficient to force the doors open with a high angular velocity, that is, approximately 50 radians per second, thus requiring the incorporation of a substantial shock absorber and supporting structure in the condenser compartment to absorb the door forces. To accommodate such high forces, that is, about 40,000 foot pounds of energy, an air box type shock absorber slightly larger than each door, is mounted on the reactor lower support structure and in a position to be contacted by the door as it rapidly moves to an open position.

Referring to FIGS. 2 through 5, the single door 40 shown is hung on hinges 46 in a conventional manner and is designed to swing inwardly toward the shock absorber 44. The other end of hinges 46 are attached to a wall 50 which projects inwardly into the ice condenser compartment. It is understood that either single or double hung doors may be mounted in each inlet port opening 38 and in the event double hung doors are used, two shock absorber assemblies, one for each door, will be mounted on the lower wall 50 of the ice condenser compartment to permit each door to contact the shock absorber as it swings to an open position. Further, these doors may be returned to a closed position by a light spring in a manner well known in the art. The shock absorber which is described in greater detail later comprises a back plate member 48 and the assembly is then bolted or otherwise secured to the wall 50 by the back plate 48. It measures approximately 50 inches wide, 93 inches high and 28 inches deep.

Although the requirements for the shock absorber may vary depending on the environment of use and impact forces expected to be absorbed, the following illustrates the preferred embodiment of the invention. The requirements to be met include a material having less than 50 ppm extractable halides, it must be hydrolytically stable and fire resistant, and capable of absorbing the energy from an impacting door 92 inches high, 42 inches wide, 8 inches thick, weighing 360 pounds and moving at a velocity of approximately 50 radians per second equivalent to about 85 mph at the center of percussion of the door. On impact, the front member 51 of the air box absorber will collapse, forcing air out, and must absorb sufficient energy to preclude the impacting door from exceeding its 50 psi crush strength, and must not exert more than 60,000 pounds total force on the lower support structure. Also, it is important that the absorber not impart rebound energy to the impacting door. To minimize rebounding, the absorber must demonstrate characteristics which permit substantially total absorption of energy.

Knowledge of the magnitude of energy expected to be contained in the doors as they swing toward the open position and into the relatively limited space of the reactor support structure, allows a determination to be made of the required energy density of the shock absorber. FIG. 5 shows a plan view of the pertinent door and shock absorber geometries. The shock absorber is shown as having a cross-section A, B, C, D with the full line illustrating the door 40 in a closed position, and the dotted line representation showing the door at just the point of impact with the exposed surface of the shock absorber. The door 40 is permitted to move through 55° of rotation before contacting the exposed surface of the shock absorber. The compressive forces then commence collapsing the shock absorber 44. Since 75% compression is a practical maximum deflection that can be achieved before "bottoming-out" occurs, the shock absorber 44 has been chosen to provide for 85° rotation of the door which is a design stop position. As is apparent from the drawing, the space available for door rotation is 95°, but utilization of the full available space will not be made because the shock absorber is designed to accommodate all foreseeable force magnitude within 85° door rotation area.

Figure 3:
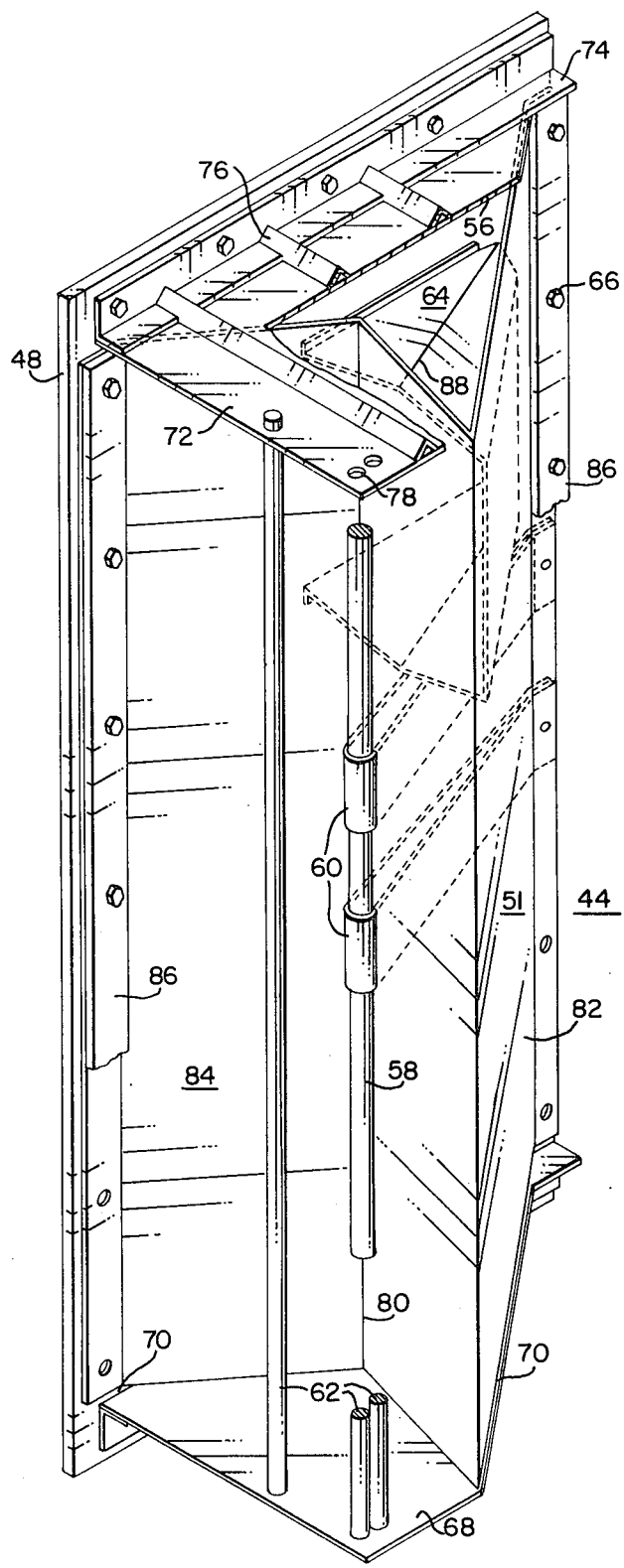
FIG. 3 is an isometric view of the disclosed shock absorber.
Figure 8:
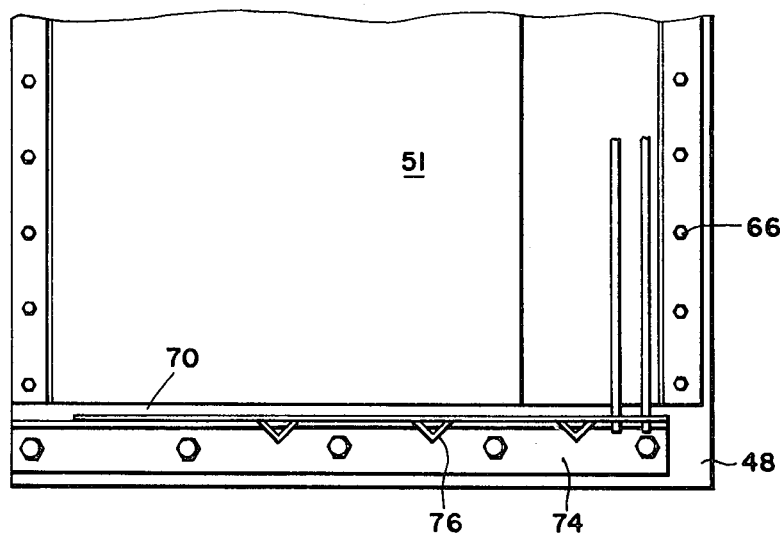
FIG. 8 is a partial top view of the shock absorber.

FIG. 3 shows the shock absorber assembly 44 in its vertical position prior to being mounted on the condenser compartment wall 50. The air box type shock absorber 44 disclosed herein, although relatively simple and easy to manufacture, meets intended functional requirements. The integrated components of the shock absorber 44 are shown best in FIG. 3. These include the back plate member 48, the inward prefolded front member 51, a top member 56, a restraining rod 58, a restraining strap 60, tie rods 62, a prefolded stiffener 64, and plate-to-front member attaching bolts 66, which also attach a clamping bar 86 to the structure. The bottom member 68, which bears a right hand-left hand relation to the top member 56, is only partially shown in the figure. The controlled clearances 70 through which air escapes from the absorber 44 during compression lay between the top member 56 and the front member 51 and between the bottom member 68 and the front member 51, and are shown best in FIG. 8.

The back plate member 48 must be sufficiently rigid to prevent damage to the front member 51 due to flexing prior to, and during, installation. It also must have sufficient strength to allow attachment of the absorber 44 to the supporting structure, and to transmit the static and impact loading. The plate 48 material may be wood, reinforced plastic, or metal. During testing, both plywood and metal were used successfully. To minimize corrosion, metals such as stainless steel, copper, or galvanized carbon steel may be used. Aluminum components are generally avoided in a nuclear containment environment, although aluminum would be an appropriate material for an absorber 44 used for other functions.

The top 56 and bottom 68 members are attached by welding or other fastening means to the back plate 48. They are identical, but reversed in a right hand-to-left hand fashion, and are shown in FIGS. 6 and 7. The function of the top 56 and bottom 68 members is to provide the controlled clearance 70 for release of air. They are roughly triangular in shape, and, as with the back plate 48, may be sheet metal or reinforced plastic, among other materials. The member shown comprises a stainless steel sheet metal section 72 reinforced at the bottom with an angle 74, and along the face with angular supports 76. The members 56 and 68 must be sufficiently strong to withstand the pressure generated within the shock absorber 44, which can reach as high as 17 to 20 psi. Since the forces on these members internally are in opposite directions, tie rods 62 are used to join the top members 56 and bottom members 68 to neutralize the forces, through holes 78. The tie rods 62 must be located at a position far enough from the front member 51 to avoid any interference when the shock absorber 44 compresses.

The restraining rod 58 and strap 60 are used to prevent the inward prefold 80 of the front member 51 from unfolding outward during impact. The rod 58 may be a metal bar held by sheet metal straps 60. The straps 60 are affixed to the back plate member 48 along with the front member 51. This allows the rod 58 to move along a circular arc with the strap length as a radius. To equalize the loading imparted by the rod 58, two or three straps 60 spaced along the rod 58 should be used. In testing, a cast iron pipe was used in conjunction with three stainless steel sheet metal straps.

For purposes of discussion, the front member 51 comprises an impact face 82 and a prefolded side 84. The member 51 may be manufactured as one piece, or joined by air tight means, such as welding, at about the juncture of the impact face 82 and the inward prefolded side 84. The sheet metal must be ductile, so as not to fail upon loading. The front member 51 may be sheet metal, such as stainless steel, and must be strong enough to withstand the internal pressure and not shear at the attachment to the back plate 48. The sheet metal must be joined at opposite edges to the back plate 48 in an air tight manner. Such attachments can include welding, or clamping bars 86 and bolts 66 as shown in FIG. 3.

The door 40 impacts on the impact face 82. The impact face 82 is slightly larger than the door to avoid interference between the door 40 and the top 56 and bottom 68 members, and to insure that the door 40 does not close over the controlled clearance 70. During testing there was slight local deformation of the impact face 82 where the edge of door 40 contacted the face 82. The inward prefold 80 folds inward as the impact face 82 moves toward the back plate. To insure proper operation, the angle formed at the prefold should be obtuse. The air trapped within the shock absorber 44 is compressed as the front member 51 folds. This compression and internal pressure rise also causes the unrestrained portions of the prefolded side 84 to fold outward.

Prefolded stiffeners 64 are also located between, and attached to, the impact face 82 and the back plate 48. These stiffeners prevent collapse of the impact fact due to small accidental loads. They also provide a resistance, in addition to the air pressure, against the movement of the impact face 82. They may be constructed of sheet metal, and provided with a predetermined bend 88 to ensure buckling in the desired direction and to prevent excessive stiffness. The stiffeners 64 also act to minimize any rebound of the shock absorber. They may be basically a Z-shaped sheet with edges for attachment, or hat shaped with attaching edges as shown in FIG. 3. Attachment may be by tack welding.

OPERATION

When the lower inlet doors 40 open due to the sudden pressure rise in the containment, they impact on the impact face 82 of the shock absorber 44. The impact face then moves with the door. Because of the restraining rod 58 the internal volume decreases rapidly. This volume decrease results in an increase in the internal pressure. The kinetic energy of the swinging door 40 is used up in compressing the air. To prevent an excessive pressure rise, the air is allowed to escape through the controlled clearances 70. A small amount of the air will also escape through the openings in the prefolded side 84 through which the restraining straps 60 pass. A portion of the kinetic energy will also be used up in buckling of the stiffeners. The area of the controlled clearances 70 is very critical. If the clearances 70 are too small, there will be an excessive pressure buildup and, therefore, an excessive load is distributed to the back member 51 and the support structure to which it is attached. If the clearances 70 are too large, the pressure buildup is not sufficient to stop the door, resulting in an excessive impact load. An added quality that makes the air box type shock absorber superior functionally to prior art foam absorbers, is that the resistance of the air system is variable with the impact load, which is not true of the foam system. The compressive resistance of the air is lesser to a smaller impact load and greater to a larger impact load. Further, the door 41 must be free to rotate on its hinges 46, and remain undamaged, after impact. This is to allow its return to a partly open position by means such as springs (not shown). If the doors 41 were to remain fully open subsequent to impact, there is the possibility of an uneven distribution of the steam during the boil-off period subsequent to the initial pressure burst. This could result in high local melting in one area of the condenser compartment 15, thereby opening a flow path without the condensing function.

TESTING

To insure that the functional requirements of the shock absorber would be met and specifically to check the controlled clearance 70, extensive testing was performed. Such tests have been made at an equivalent of 100 percent and 140 percent of the most severe containment pressure transient, analytically determined. The tests proved successful in operation of the shock absorber under both loading conditions. The controlled clearance 70 was approximately one inch on each side.

Figure 9:
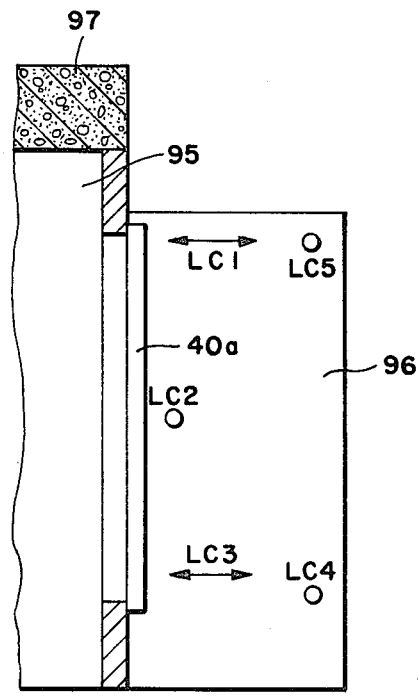
FIG. 9 is a schematic of a test structure, particularly showing the location of load cells.

The test system (FIG. 9) included a stilling chamber 95 in which a prototype door frame assembly 40a was mounted. High pressure nitrogen, stored in seven pressure vessels, was introduced into the stilling chamber through connecting piping and by remotely activating two explosively actuated rupture discs. A shock absorber was mounted on a support structure 97, and the support structure attached to a reaction structure 96 by means of load cells. Pressure transducers and other load cells were placed throughout the test system. Extensive instrumentation and high speed photography was also included in the tests.

Figure 10:
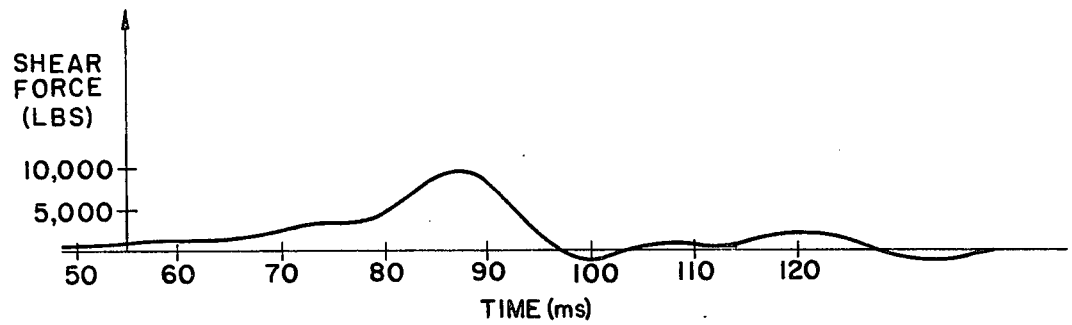
FIG. 10 is a test graph of shear force versus time.
Figure 11:
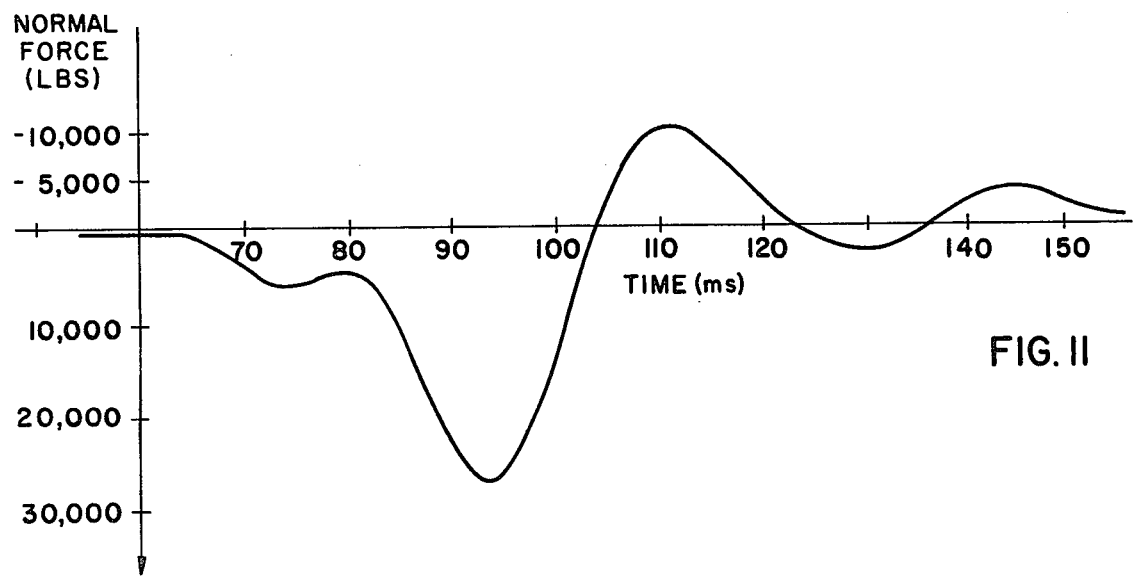
FIG. 11 is a test graph of normal force versus time.

Five load cells, noted LC1 through LC5, are shown mounted on the reaction structure 96. Load cells LC2, LC4, and LC5 were mounted to indicate normal loads, and load cells LC1 and LC3 were mounted to indicate shear forces. The shear force with the largest peak is shown in FIG. 10, graphing time in milliseconds versus load in pounds, as indicated by load cell LC1. The normal force with the largest peak is shown in FIG. 11, also graphing time in milliseconds versus load in pounds, as indicated by load cell LC2. Both graphs represent data from the test performed at the 140 percent level, and the data has been filtered to 50 Hz. As seen, the maximum shear load was about 10,000 pounds, and the maximum normal load was about 28,700 pounds. A vector summation of these maximums results in a maximum load on the reaction structure of 30,400 pounds. This is less than the structural loading resulting from similar tests on a prior art foam-type shock absorber, and well within load limitations on the containment.

It is therefore seen that an air box shock absorber as disclosed herein can absorb high kinetic energy with a minimum rebound. In an ice condenser containment, the inlet doors will remain free and undamaged in the unlikely event of a reactor primary system rupture. The shock absorber is relatively inexpensive to manufacture and install. It can also be recognized that although the shock absorber disclosed was initially conceived for a specific function, similar shock absorbers can be utilized for systems other than the ice condenser containment specifically described herein.

It will be apparent that many modifications and variations are possible in light of the above teachings. For example, the shock absorber could be mounted on the rear surface of the door, or various combinations of materials could be used for the components of the absorber. It therefore is to be understood that within the scope of the appended claims, the invention may be practiced other than as specifically described.

We claim:

1. An improved shock absorber system for use in an ice condenser compartment of a nuclear reactor including:
   i. a containment enclosing a reactor compartment containing a nuclear reactor having a closed cooling system including piping connecting the reactor, pumps and a steam generator in a closed loop;
   ii. a wall in the reactor compartment spaced from the inner surface of the containment, the space therebetween defining an ice condenser compartment; and
   iii. multiple aligned ports located in the bottom of said wall, movable doors mounted in each of said ports, said ports providing access from the reactor compartment to the ice condenser compartment so that in the event of rupture of said piping, coolant released inside the reactor compartment generates steam pressure which forces said doors under high velocity to an open position thereby providing an avenue for escape of steam into the ice condenser compartment, wherein the improvement comprises:
   a separate air box shock absorber mounted inside the condenser compartment adjacent one of said ports for absorbing the energy imparted to each door by the steam pressure, said shock absorber comprising a back member slightly larger than each of said doors, a prefolded inward front member, and top and bottom members positioned such that a controlled clearance exists between said top member and said front member and between said bottom member and said front member, whereby upon impact of said door against said front member air within said shock absorber is compressed and forced out of said shock absorber through said controlled clearances such that said shock absorber absorbs the impacting forces of the door without the door rebounding to a closed position.

2. The shock absorber system of claim 1 wherein said front, top and bottom members are stainless steel sheet metal.

3. The shock absorber system of claim 1 comprising stiffeners within said shock absorber in contact with said front and back members.

4. The shock absorber system of claim 3 comprising supporting members affixed to said top member and to said bottom member.

5. The shock absorber system of claim 4 comprising tie rods affixing said top member to said bottom member.

6. The shock absorber system of claim 1 comprising a restraining rod at the outer surface of said front member, at said prefold, and attached to said back member by restraining straps so as to prevent at least part of said inward folded front member from folding outward when said door impacts said front member.

* * * * *